US005176488A

United States Patent [19]

Boda

[11] Patent Number: 5,176,488

[45] Date of Patent: Jan. 5, 1993

[54] COMBINATION REAR LOADING COMPACTOR AND RECYCLER

[75] Inventor: Robert A. Boda, Rochester, Minn.

[73] Assignee: McNeilus Truck and Manufacturing, Inc., Dodge Center, Minn.

[21] Appl. No.: 759,613

[22] Filed: Sep. 16, 1991

Related U.S. Application Data

[63] Continuation of Ser. No. 535,430, Jun. 8, 1990, abandoned.

[51] Int. Cl.[5] .......... B60P 1/28

[52] U.S. Cl. .......... 414/525.4; 100/218; 100/233; 414/525.5

[58] Field of Search .......... 414/406-409, 414/500, 512, 517, 519, 525.1, 525.2, 525.3, 525.4, 525.55, 507, 525.5; 100/218, 233, 244, 260, 261, 263, 264

[56] References Cited

U.S. PATENT DOCUMENTS

| | | | |
|---|---|---|---|
| 2,653,724 | 9/1953 | McBride | 414/525.55 X |
| 3,826,787 | 7/1974 | Smolka | 100/233 X |
| 3,910,434 | 10/1975 | Ebeling et al. | 414/408 |
| 3,968,891 | 7/1976 | Perkins . | |
| 4,057,154 | 11/1977 | Neufeldt . | |
| 4,113,125 | 9/1978 | Schiller . | |
| 4,242,953 | 1/1981 | St. Gelais | 100/233 X |
| 4,310,279 | 1/1982 | Johnston | 414/525.55 X |
| 4,425,070 | 1/1984 | Howells et al. . | |
| 4,458,588 | 7/1984 | Steele | 100/218 X |
| 4,538,951 | 9/1985 | Yeazel et al. | 414/407 |
| 4,552,500 | 11/1985 | Ghibaudo et al. . | |
| 4,597,710 | 7/1986 | Kovats . | |
| 4,648,775 | 3/1987 | Verner . | |
| 4,682,699 | 7/1987 | Ertley . | |
| 4,691,959 | 9/1987 | Verner . | |
| 4,804,289 | 2/1989 | Blough . | |
| 4,830,436 | 3/1989 | Sockwell et al. | 298/18 X |
| 4,840,531 | 6/1989 | Dinneen . | |
| 4,892,454 | 1/1990 | Behling et al. | 100/233 X |
| 4,978,271 | 12/1990 | Seeder | 414/408 X |
| 4,979,866 | 12/1990 | Croy | 414/517 |

FOREIGN PATENT DOCUMENTS

| | | | |
|---|---|---|---|
| 908668 | 3/1982 | U.S.S.R. | 414/517 |
| 1178663 | 9/1985 | U.S.S.R. | 414/408 |

*Primary Examiner*—David A. Bucci
*Assistant Examiner*—Robert Katz
*Attorney, Agent, or Firm*—Haugen and Nikolai

[57] ABSTRACT

A refuse collecting truck combines the attributes of a rear loading, compacting refuse collecting system with a plurality of specialty containers which can be used to collect, compact and eject curbside separated recyclable materials of a plurality of types. The plurality of separate recyclable containers are designed to be mounted ahead of the rear loading, compacting refuse container behind the cab. The number and volume length of such containers may be varied as desired. The containers are configured with a side entry port and are accessed and operated from the side both for loading and unloading. Complete compacting and ejecting mechanisms are provided.

25 Claims, 5 Drawing Sheets

COMBINATION REAR LOADING COMPACTOR AND RECYCLER

This is a continuation of copending application Ser. No. 07/535,430, filed on Jun. 8, 1990, now abandoned.

BACKGROUND OF THE INVENTION

I. Field of the Invention

The present invention is directed generally to bodies for refuse pick-up trucks, and more particularly, to an improved body incorporating a plurality of side loading compacting and ejecting containers for curb separated recyclables in combination with a compacting rear loading refuse collection and compacting container.

II. Description of the Related Art

Refuse pick-up trucks commonly include a truck chassis fitted with a body that is made by a manufacturer other than the manufacturer of the chassis. The truck body is specifically designed for receiving, compacting and discharging refuse materials. One very successful design of such custom-made truck bodies includes a refuse containing reservoir accessible for loading and discharge from the rear of the vehicle. This system includes an hydraulic compacting mechanism which repeatedly compacts the refuse after each loading, moves the refuse forward in the truck toward the front end, eventually filling the available volume. The forward wall against which the refuse is compacted also forms part of a cylinder-operated ejection mechanism which is provided and which moves aft to expel the contents of the refuse volume during ejection.

Typically, such systems include a single large volume for containing all the trash and refuse collected and no provision is made for separating any of it by type or to process curbside separated recyclable materials. Today, recycling of materials such as aluminum, glass, paper and other materials is becoming more and more important and, in certain jurisdictions, has or will soon become mandatory. In many places containers are provided for curbside separation and segregation of materials. However, in order for the hauler to pick up the curbside recyclable materials, additional trips must be made to the site utilizing separate vehicles designed to handle curbside collection of source separated recyclable materials.

In this regard, it would be quite advantageous if a single vehicle had the ability to collect normal refuse together with a plurality of predetermined categories of curbside separated recyclable materials during a single stop. Such a vehicle would certainly be a great help with regard to more efficient, lower cost management of solid waste including the recycling of separated materials, and recycling certainly appears to be the way of the future.

SUMMARY OF THE INVENTION

By means of the present invention, there is provided a refuse collecting truck body which combines the attributes of a rear loading, compacting refuse collecting system with a plurality of specialty containers which can be used to collect, compact and eject curbside separated recyclable materials of a plurality of types. The plurality of separate recyclable containers are designed to be mounted ahead of the rear loading, compacting refuse container behind the cab. The number and volume length of such containers may be varied as desired. The containers are configured with a side entry port and are accessed and operated from the side both for loading and unloading. They, of course, may be mounted with the access and controls facing either side of the truck.

In the illustrative embodiment, the recycle containers are substantially cylindrical in shape; and may be of any desired length, i.e., the designed length may be varied according to the relative amounts of the different recyclable materials anticipated. The side port provided includes a compound door that opens to form a hopper that is readily addressed for easy loading from the curb at a relatively low height so that curbside separation containers can be readily emptied. Shutting the door, then, loads the charge of materials into the container. A mechanism is provided which operates in one mode to compact each charge of material within the hollow volume and in another mode to completely discharge or eject the accumulated contents. The compound door forming the hopper further opens to form a discharge chute for the ejection or discharge operation. The doors are preferably of a design which combines cylinder and hand actuated operation complete with the necessary safety features.

The compacting and ejection system of each recycle container in accordance with one successful design further consists of a dual blade system. In that system, two blades of a width close to the internal cylinder length are radially journalled for independent pivotal operation about a central longitudinal shaft in the recycle container. The blades are mounted to operate cooperatively in two modes, namely, a loading or compacting mode and an ejecting or discharging mode. In the compacting mode, one of the blades, a cylinder-operated compacting blade, forces material loaded into the container radially around the periphery of the container compacting it against the second or ejecting blade which is damped to provide a degree of resistance to radial movement. A positive stop limits the radial travel of the ejecting blade. In the ejecting mode, the compactor blade is used to operate the ejector blade. In this mode, pawls associated with the compacting blade engage a pair of ratchet wheels journalled about the central shaft and fixed to the ejector blade in a manner such that the reciprocal operation of the compacting blade cylinder causes the ratchet wheels to rotate in a direction opposite that used for compacting. The pawls engage the teeth of the ratchet wheels and cause them to rotate an amount during the retraction portion of the reciprocal operation of the piston rod of the compacting blade cylinder. This causes the ejector blade to rotate and dispel all the compacted contents out the side access. In conjunction with this operation the access door is fully opened to form the chute-like configuration through which the material is completely discharged from the container by gravity.

The present invention provides a combination in which general refuse and a plurality of curbside separated materials can be collected conveniently in one trip. The system can be tailored to meet any combination of collection needs with respect to numbers of separable recyclables and relative volumes of materials to be collected. The foregoing is accomplished in a simple, easily operated and convenient manner.

BRIEF DESCRIPTION OF THE DRAWINGS

In the drawings wherein like numerals are utilized to designate like parts throughout the same.

DESCRIPTION OF THE ILLUSTRATED EMBODIMENT

The detailed description depicts one or more specific forms of the present invention; however, these are by no means meant to be limiting as to the scope of the invention in any manner and it is contemplated that other forms or variations might occur to those skilled in the art. This, of course, includes modifications with respect to placement of containers and mechanical equivalents to mechanisms, for example.

Figure 1:
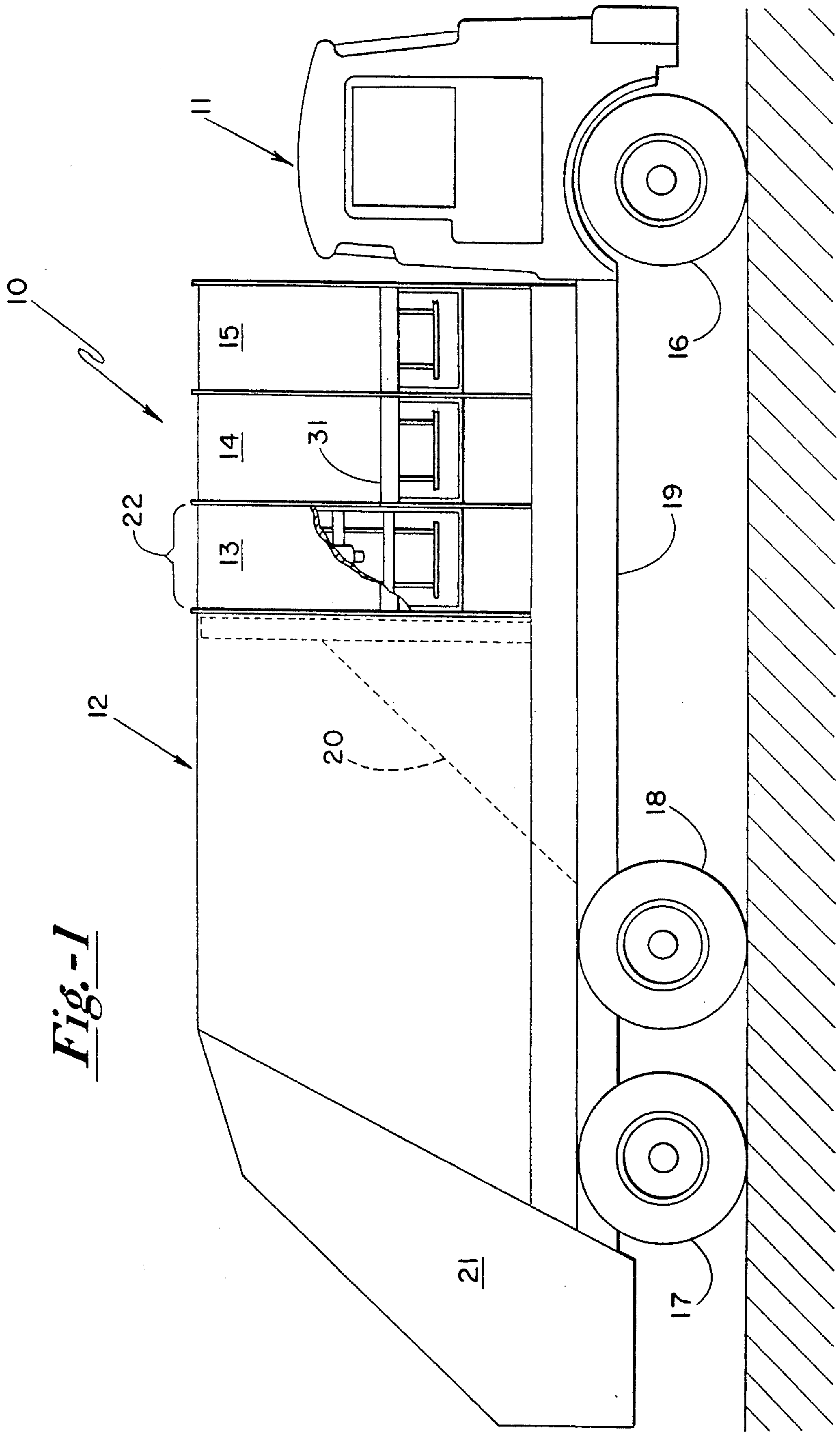
FIG. 1 is a side elevational view, with parts cut away, of a refuse collecting vehicle including a truck chassis fitted with a refuse compactor body of the rear loading type and further including a plurality of collection vessels for recyclables in accordance with the invention.

FIG. 1 depicts a complete refuse vehicle shown generally at 10 which includes a truck body or chassis 11, a refuse compactor body, generally at 12, mounted on the chassis 11, and a plurality of additional side accessible recycle vessels 13-15 for processing curbside separated recyclables. The vessels 13-15, of course, can be mounted so as to be accessed from either the driver or passenger side (port or starboard) of the truck chassis. The length or longitudinal dimension of each vessel 13-15 may also vary according to a particular embodiment. The truck chassis itself may be of a class of conventional refuse-hauler type chassis including a steerable front-axle assembly complete with wheels, etc. illustrated by 16, a two-axle rear suspension as illustrated at 17 and 18 connected by a relatively heavy box-supporting frame 19 which are also conventional for such vehicles. A conventional refuse ejection pusher is shown in phantom at 20 which is operated by an hydraulic cylinder (not shown) in a well known manner. The large conventional refuse hopper for the rear loading compactor is shown at 21.

The recycle containers or vessels 13-15 are preferably in the shape of right circular cylinders of a diameter governed by the truck size (allowable height and width) and of a length which may be determined by the relative amount of the particular recyclable material of interest expected to be collected. The recycle containers are shown in the collecting or refuse receiving position. They are designed to be accessed and operated or controlled from the side for both loading and unloading and are designed for individual separate operation.

Figure 2:
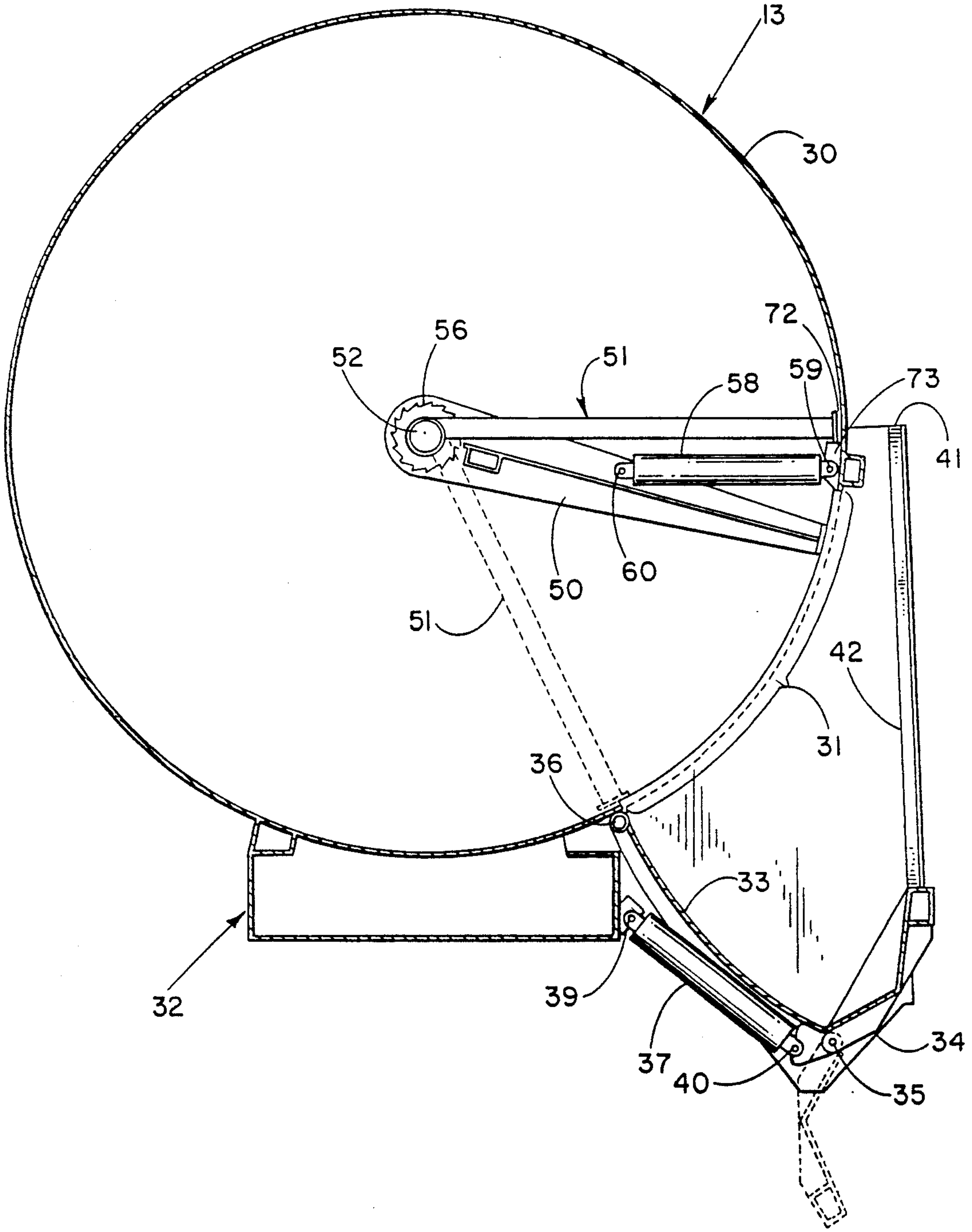
FIGS. 2 and 3 are enlarged views depicting the door, compaction and ejection mechanisms within a recycle container of the invention.
Figure 3:
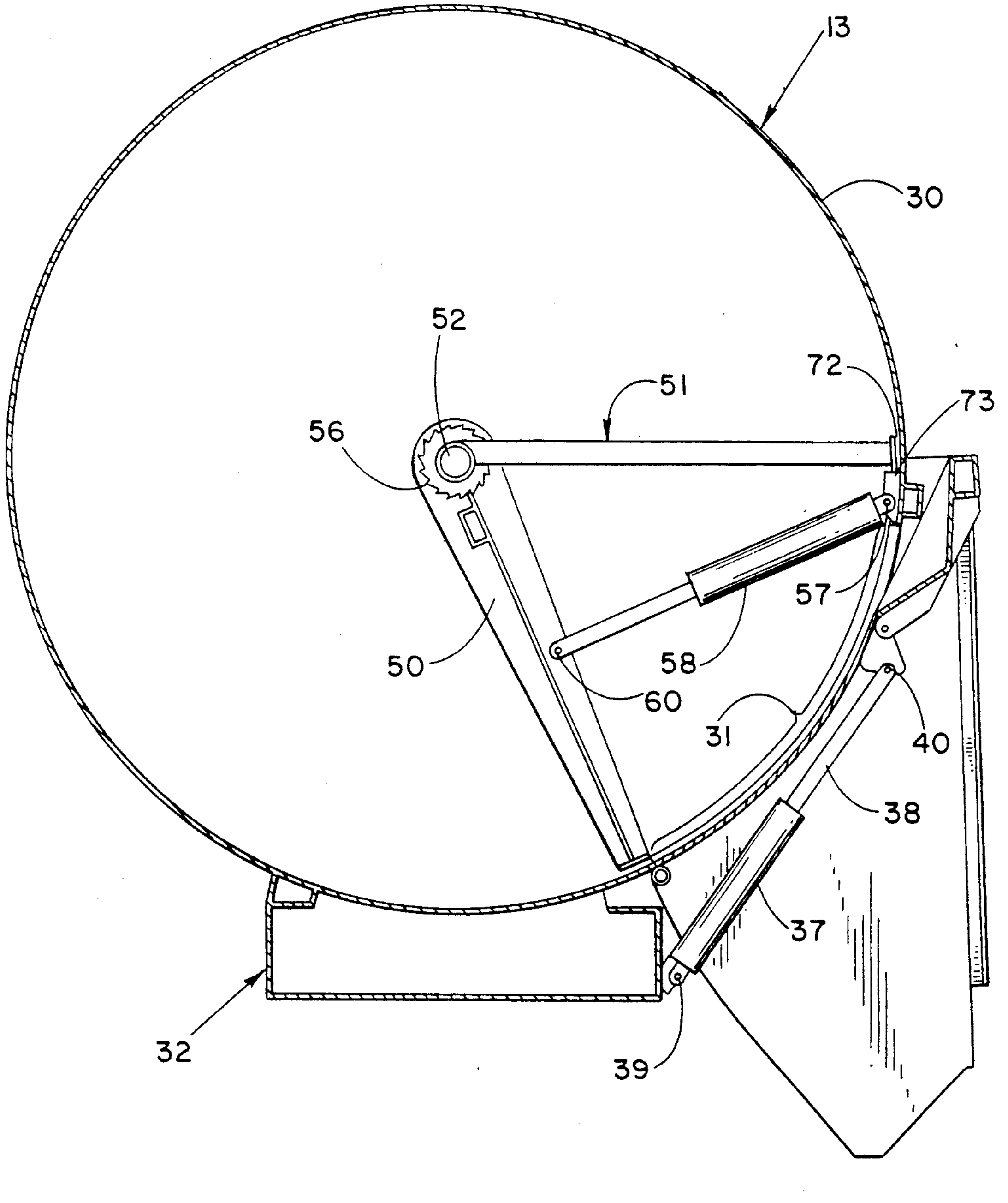
Figure 4:
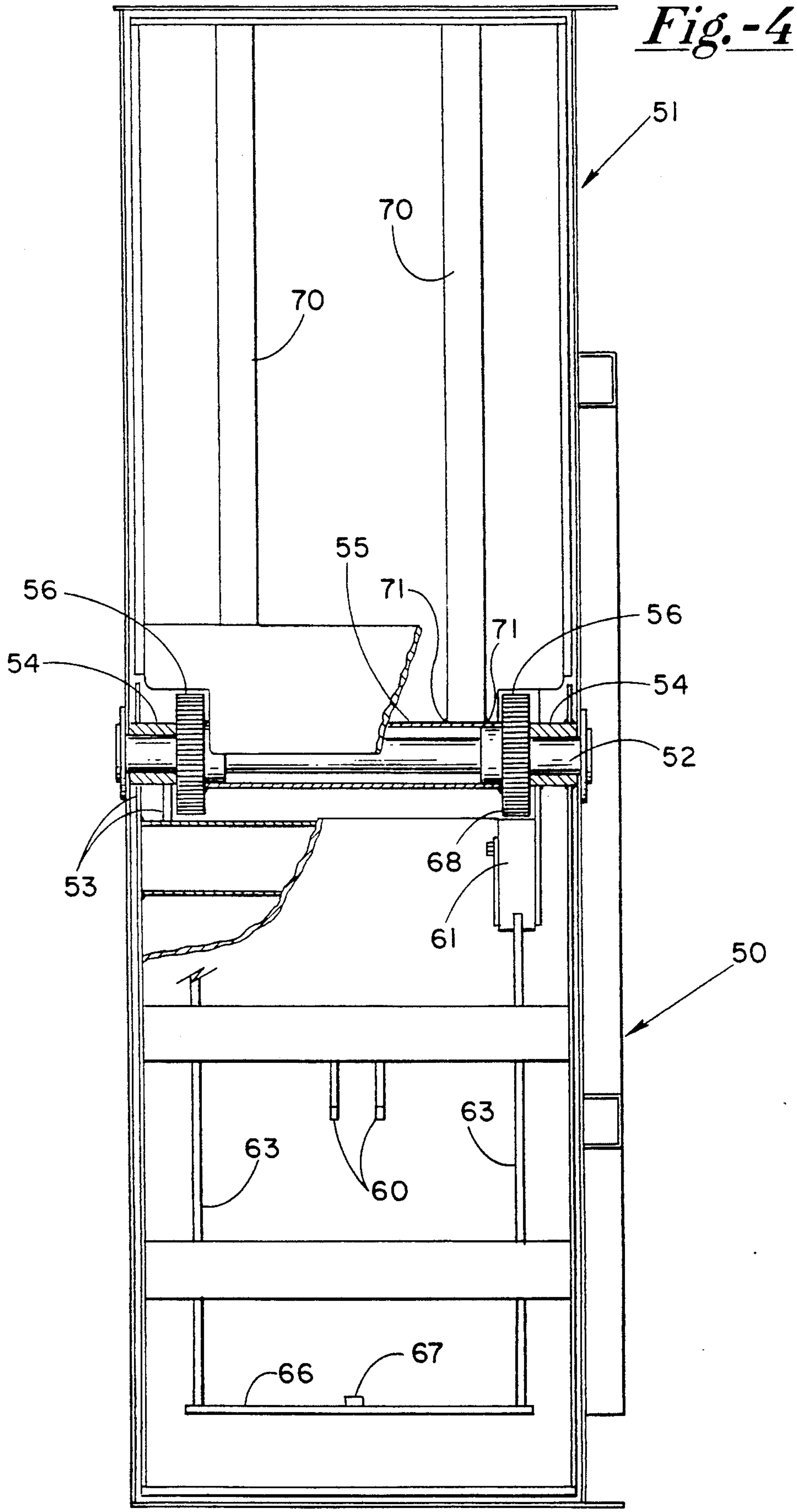
FIG. 4 is an enlarged view with parts cut away of the dual blades for one such recycle container.

FIGS. 2 and 3 are enlarged views depicting the compound door, compaction, and ejection mechanisms of one such recycle vessel. As seen in those figures, the vessel 13 has a generally circular shell 30 which describes a circular circumference but including an open or access segment 31 describing a loading and unloading access. The generally cylindrical container has a support frame 32 which is adapted to be fixed to and carried by the truck chassis. The open or access segment 31 is addressed by a two-section compound, double pivoted closure system which includes a lower door element 33 and an upper door element 34. The upper door element 34 is pivotally attached to the lower door element 33 by hinge pin 35 and the lower door member 33 is hinged to the container wall 30 as at 36. The lower door member 33 is further attached to a fluid-operated cylinder as at 37 including a piston rod member 38 attached pivotally at 39 to the support frame 32 and at 40 to the lower door member 33. The movement of the upper pivotal door member 34 is further guided by an attached cam follower (not shown) which is adapted to ride in a recessed slot 42 provided in the vertical structural member 41 during opening and closing of the compound door for loading and compacting.

FIG. 2 depicts the compound door of the recycle vessel 13 in both open positions The first open position is that normally used for loading refuse in which the door defines a hopper to contain recyclable material as that dumped from a curbside separation container. The alternate or fully-open position in which the pivotal outer door 34 is in its fully lowered position is shown in phantom. This is accomplished by pulling up on the door such that the follower member, normally in the recessed slot 42, can be removed through an opening provided near the bottom of the slot and the door lowered much in the manner of a tailgate on a conventional pick-up truck. In this manner, each particular type of the trash ejected can be fully unloaded by gravity from the recycle vessel. The trash slides across lower door member 33 and down into a waiting container at a recycling facility.

In accordance with the present invention, there is also provided an unique compacting and ejection system for the recycle collecting vessels. The system involves the cooperation of two blades, namely, a compacting blade 50 and an ejection blade 51, (both of which are best shown in FIGS. 2-5). The blades are operated in conjunction with the compound door mechanism.

Figure 5:
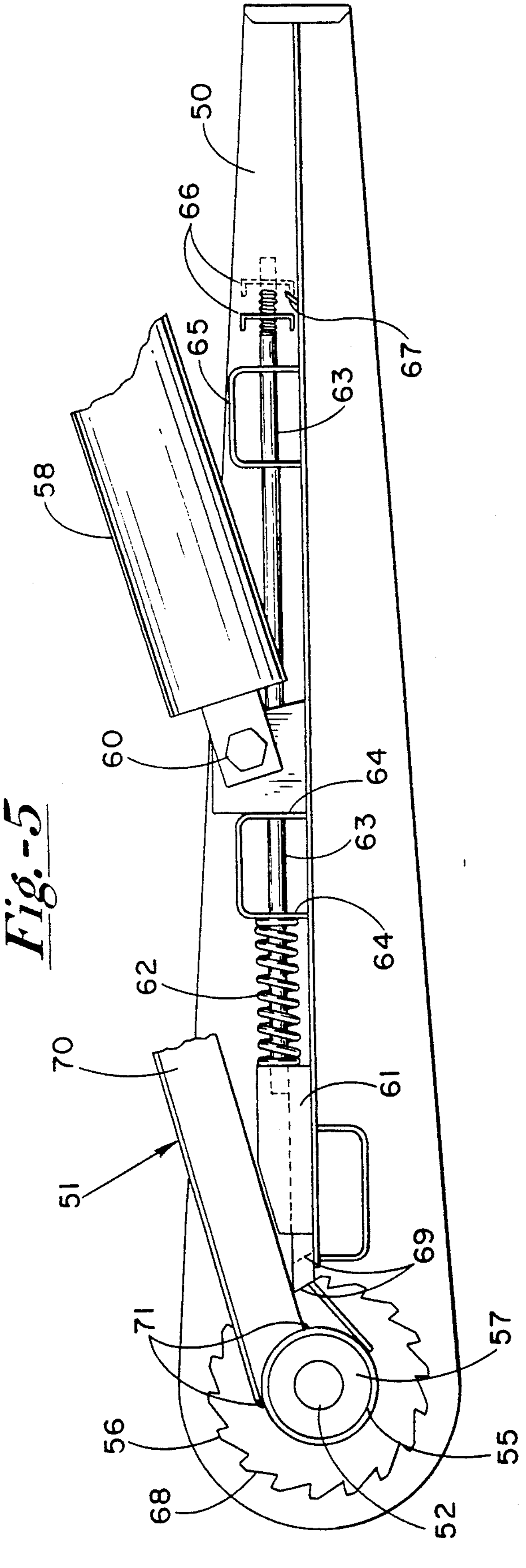
FIG. 5 is an enlarged fragmentary view showing a blade construction.

The blades 50 and 51 are journalled about a central stationary shaft 52 in a manner which allows each to pivot radially about the shaft independently. The blades are of a width approaching that of the internal cylinder length which allows just sufficient clearance for operation within the volume of the container. The compacting blade 50 is attached at 53 to a pair of sleeve members 54 which are journalled about the shaft 52 as freely rotating mounts using conventional bushings (not shown). The ejector blade 51 is fixed to a centrally mounted sleeve member 55 which, in turn, is also journalled about the shaft 5 for free rotation by conventional bushings, indicated at 57, located in the ratchet hub (FIG. 5). A pair of ratchet wheels 56 are also fixed to the sleeve member 55. The ratchet wheels are configured to operate the blade 51 in a counterclockwise direction as described below.

The compactor blade 50 is operated by a fluid-operated cylinder 58 pivotally attached to the shell of the container 13 at 59 and pivotally attached to the blade 50 at 60. The mechanical interaction of the blades and the mechanical system are best shown in the greatly enlarged views of FIGS. 4 and 5. The pair of spaced ratchet wheels 56 are operated in conjunction with a retractable, spring-loaded ratchet engaging system which is attached to and operates in conjunction with the compacting blade 50.

The ejector system includes a pair of spaced parallel ratchet engaging pawl members 61, load springs 62 and rod members 63. The rod members 63 are slidably mounted in a pair of retainers 64 and 65 fixed to the blade 50. Springs 62 operate between the pawl members 61 and the retainer 64 which also serve as spring stop members to urge the pawl members 61 forward toward the teeth of the ratchet wheels 56. The substantially parallel spaced rod members 63 are joined at their extremities by a common cross member or handle 66, which may be a channel member, into which they are threaded. The pawl members 61 are operated in unison by movement of the handle 66 away from or toward the ratchet. A stop 67 is provided on the blade 50 such that when the member 66 is moved and retained behind the stop, the pawl members 61, as shown in phantom in FIG. 5, are disengaged from the teeth 68 of the ratchet wheel 56 as at 69. When the connecting member 66 is released from its position behind the stop 67, springs 62 operate to thrust the pawl members 61 forward engaging the teeth 68 of the ratchet wheel 56.

The heavy gauge ejection blade 51 also contains a pair of longitudinal stiffening supports 70 which also aid in attaching the blade to the sleeve 55 as at 71 (FIG. 5). The blade 51 is generally free to rotate with the ratchet wheels 56 about the shaft 52 as long as the pawls 61 are disengaged. In order to dampen or create an amount of resistance to the free rotation or pivotal motion of the blade 51, a damping or friction pad 72 is attached to the end of the blade 51 which operates against the shell 30 of vessel 13 to dampen the free rotation of the blade 51. The friction pad 72 imparts the desired degree of resistance to rotation for operation with the compactor blade 50. A positive stop 73 is also provided on the shell 30 to mark the end of the allowable clockwise travel of the ejector blade 51.

During the normal course of events, the system of the typical recycle vessel or container operates in the manner described next. This sequence begins with the recycle vessel empty or partially filled and just after a packing sequence has been completed. The position of blade 50 is with cylinder 58 fully extended (as in FIG. 3) and the piston rod 38 of cylinder 37 is retracted such that the double hinged, compound door is in the position shown in FIG. 2 forming the hopper configuration ready to receive material.

First, cylinder 58 is retracted raising the blade 50 to the pre-packing position also illustrated in FIG. 2. With a charge of material deposited in the hopper, cylinder 37 is then extended to close the compound door to the position illustrated in FIG. 3 with the compacting blade 50 remaining in the raised position as depicted in FIG. 2. Cylinder 58 is then extended to rotate the packer blade 50 clockwise thereby sweeping the material off the inner surface of door 33 into the vessel in the clockwise direction. Thereafter, door operating or loading cylinder 37 is again retracted to the position shown in FIG. 2 to reform the hopper in preparation for the next charge. The packer blade 50 retains the packed materials in the container 13 until the cycle is repeated.

The sequence of events is repeated numerous times, the recyclable material being compressed against the ejection blade 51. The blade 51 is pushed by the compacting material in a clockwise direction until it meets the stop 73 and the maximum compression is achieved between the blades 50 and 51 with the blade 51 firmly resting against the stop 73. In this manner, the volume of the container 13 is filled with compacted recyclable material of interest.

To empty the contents of the vessel 13, the door member 34 is dropped to its fully lowered or tailgate position and the handle member 66 is released from behind the stop 67 so that the pawls 61 engage the ratchet wheels 56. When the cylinder 58 is now reciprocated repeatedly, the ratchet wheels turn only on the retraction portion of the piston rod reciprocation cycle which causes them, in turn, to rotate the blade 51 a distance in the counterclockwise direction with each stroke. After a number of strokes, the blade 51 sweeps through the entire volume. In this manner, the compacted material of interest is ejected and spills down across door member 33 and into a waiting container located beneath the member 34. This accomplishes a simple and complete evacuation of the system illustrating ease of side loading and discharge.

This invention has been described herein in considerable detail in order to comply with the Patent Statutes and to provide those skilled in the art with the information needed to apply the the invention can be carried out by modified or specifically different equipment and devices and that variations and modifications both as to equipment details and operating procedures can be accomplished without departing from the scope of the invention itself.

What is claimed is:

1. A waste management system for processing a plurality of types of refuse of interest for vehicle mounting behind the cab portion of a chassis having a cab portion and a body receiving portion rearward of the cab portion, comprising in combination:

- a refuse compactor body of the rear loading type mounted on the truck chassis behind the cab portion thereof;
- at least one self-contained recycle vessel in the form of a side mounted right circular cylinder having a sidewall spacing two endwalls for receiving separated recycle materials mounted forward of the rear-loading refuse compactor body and behind the cab portion of the vehicle;
- a compound loading and discharging access closure system associated with each such recycle vessel including a lower door element and an upper door element which cooperate to further define a loading hopper when partially open and a discharge chute when fully open;
- recycle compactor means and ejector means associated with each recycle vessel comprising a centrally mounted shaft, substantially parallel to the cylinder wall, in each recycle vessel, first and second blades of a width and length close to the internal length and radius dimensions of the cylinder-shaped vessel, wherein the blades are journalled for independent pivotal rotation on the centrally mounted shaft such that the blades move radially within the vessel and wherein the operation of the first blade in a first direction in cooperation with the second blade causes refuse of interest to be compacted between the blades and the operation of the second blade in a direction opposite the first causes the movement of the refuse of interest to be reversed and the refuse discharged back through the opened access.

2. The waste management system of claim 1 wherein the lower door element of the compound access closure system and the first blade of the recycle compactor and ejector means are power operated.

3. The waste management system of claim 1 further comprising:

- a fluid-operated cylinder pivotally connected to and operated to open and close the lower door element of the closure system;

wherein the upper door element further comprises a cam and follower guide system; and the guide system disengageable allowing the lower door segment to pivot downward to form, with the upper door segment, a discharge chute for the ejection of material from the recycle vessel.

4. The waste management system of claim 1 further comprising:

fluid-operated cylinder means having a piston rod connected between the recycle vessel and the first blade having a reciprocating piston rod for operating the first blade radially within a circular segment of the recycle vessel;

ratchet means attached to the second blade and adapted to be disengagably rotated in one direction by the first blade to pivot the second blade;

retractable pawl means attached to the first blade for engaging and disengaging the first blade with the ratchet means in a manner such that when the pawl means engages the first blade with the ratchet means, the reciprocal operation of the piston rod rotates the second blade in stepping fashion to discharge the refuse of interest.

5. The waste management system of claim 3 further comprising:

fluid-operated cylinder means having a piston rod connected between the recycle vessel and the first blade having a reciprocating piston rod for operating the first blade radially within a circular segment of the recycle vessel;

ratchet means attached to the second blade and adapted to be disengagably rotated in one direction by the first blade to pivot the second blade;

retractable pawl means attached to the first blade for engaging and disengaging the first blade with the ratchet means in a manner such that when the pawl means engages the first blade with the ratchet means, the reciprocal operation of the piston rod rotates the second blade in stepping fashion to discharge the refuse of interest.

6. The waste management system of claim 1 further comprising friction generating damping means associated with the second blade to impart an amount of resistance to the free rotational travel of the second blade.

7. A waste management system for vehicle mounting behind the cab portion of a chassis having a cab portion and a body receiving portion rearward of the cab portion, comprising in combination:

at least one self-contained recycle vessel in the form of a side mounted right circular cylinder, having a sidewall spacing endwalls, for receiving separated recyclable materials, the recycle vessel being mounted behind the cab portion of the vehicle;

side loading and discharge means associated with each recycle vessel;

a compound access closure system associated with each recycle vessel and including a lower door element and an upper door element which cooperate to further define a loading platform when partially open and a discharge chute when fully open;

recycle compactor means and recycle ejector means associated with each recycle vessel comprising a centrally mounted shaft in each recycle vessel disposed substantially parallel to the sidewall of the vessel, first and second blades of a width and length close to the internal length and radius dimensions of the cylinder-shaped vessel, wherein the blades are journalled for independent pivotal rotation on the centrally mounted shaft such that the blades move radially within the vessel and wherein the operation of the first blade in a first direction in cooperation with the second blade causes refuse of interest to be compacted between the blades and the operation of the second blade in a direction opposite the first causes the movement of the refuse material to be reversed and the refuse discharged back through the opened access.

8. A waste management system for vehicle mounting behind the cab portion of a chassis having a cab portion and a body receiving portion rearward of the cab portion, comprising in combination:

at least one stationary, self-contained recycle vessel for receiving separated recyclable refuse materials substantially in the form of a side mounted right circular cylinder having a sidewall spaced by a pair of endwalls mounted behind the cab portion of the vehicle;

side loading and discharging means associated with each recycle vessel which includes individual direct side access means for loading and unloading each such vessel; and individual recycle compactor means and recycle ejector means associated with each such vessel, wherein said recycle ejector means ejects said materials out of said vessel through said side access means.

9. The waste management system of claim 8 further comprising a side access closure means associated with each side access means which further defines a loading platform when in a partially open position and a discharge chute when in a fully open position.

10. The waste management system of claim 9 wherein each access closure means further comprises a two-section compound, double pivoted door system including a lower door element and an upper door element, in which the lower door element is operated in open and close by a power operated drive means.

11. A waste management system for vehicle mounting behind the cab portion of a chassis having a cab portion and a body receiving portion rearward of the cab portion, comprising in combination:

a refuse compactor body of the rear loading type adapted to be mounted on a truck chassis;

at least one stationary, self-contained recycle vessel for receiving separated recyclable refuse materials substantially in the form of a side mounted right circular cylinder having a sidewall spaced by a pair of endwalls mounted forward of the rear-loading refuse compactor body and behind the cab portion of the vehicle;

side loading and discharging means associated with each recycle vessel which includes individual direct side access means for loading and discharging each vessel; and individual recycle compactor means and recycle ejector means associated with each such vessel, wherein said recycle ejector means ejects said materials out of said vessel through said side access means.

12. The waste management system of claim 11 further comprising a side access closure means associated with each side access means which further defines a loading platform when in a partially open position and a discharge chute when in a fully open position.

13. The waste management system of claim 12 wherein each access closure means further comprises a two-section compound, double pivoted door system including a lower door element and an upper door element, in which the lower door element is operated to open and close by a power operated drive means .

14. The waste management system of claim 13 wherein the power operated door drive means is a fluid-operated cylinder.

15. The waste management system of claim 13 wherein the upper door element further comprises a cam and follower guide system.

16. The waste management system of claim 15 wherein the follower is disengageable allowing the lower door segment to pivot downward to form, with the upper door segment, a discharge chute for the ejection of material from the recycle vessel.

17. The waste management system of claim 11 wherein each recycle compactor and recycle ejector means further comprise:

a central shaft mounted in the vessel, the central shaft being disposed substantially parallel to the sidewall of the vessel;

first and second blades, the blades being of a width and length close to the internal length and radius dimensions of the cylinder, the blades being journalled for independent pivotal rotation on the central shaft such that the blades move radially within the vessel and wherein the operation of the first blade in a first direction in cooperation with the second blade causes refuse of interest to be compacted between the blades and the operation of the second blade in a direction opposite the first causes the refuse of interest to be discharged.

18. The waste management system of claim 17 further comprising friction generating damping means associated with the second blade to impart an amount of resistance to the free rotational travel of the second blade.

19. The waste management system of claim 17 further comprising power operated first blade drive means for operating the first blade.

20. The waste management system of claim 19 further comprising:

fluid-operated cylinder characterizing the power operated first blade drive means having a piston rod means connected between the recycle vessel and the first blade having a reciprocating piston rod for operating the first blade radially within a circular segment of the recycle vessel;

ratchet means attached to the second blade and adapted to be disengagably rotated in one direction by the first blade to pivot the second blade;

retractable pawl means attached to the first blade for engaging and disengaging the first blade with the ratchet means in a manner such that when the pawl means engages the first blade with the ratchet means, the reciprocal operation of the piston rod rotates the second blade in stepping fashion to discharge the refuse material.

21. The waste management system of claim 20 further comprising friction generating damping means associated with the second blade to impart an amount of resistance to the free rotational travel of the second blade.

22. The waste management system of claim 20 wherein the ratchet means further comprises a pair of spaced ratchet wheels and the pawl means comprises a pair of spaced pawls and a common operating handle connected therebetween to engage and disengage them in unison.

23. A waste management system for vehicle mounting behind the cab portion of a chassis having a cab portion and a body receiving portion rearward of the cab portion, comprising in combination:

a refuse compactor body of the rear loading type adapted to be mounted on a truck chassis;

a plurality of stationary, self-contained recycle vessels for receiving separated recyclable refuse materials substantially in the form of a side mounted right circular cylinder having a sidewall spaced by a pair of endwalls mounted forward of the rear-loading refuse compactor body and behind the cab portion of the vehicle;

side loading and discharging means associated with each recycle vessel which includes individual direct side access means for loading and unloading the vessel; and individual recycle compactor means and recycle ejector means associated with each such vessel.

24. The waste management system of claim 23 further comprising a side access closure means associated with each side access means which further defines a loading platform when in a partially open position and a discharge chute when in a fully open position.

25. The waste management system of claim 24 wherein each access closure means further comprises a two-section compound, double pivoted door system including a lower door element and an upper door element, in which the lower door element is operated in open and close by a power operated drive means.

* * * * *

UNITED STATES PATENT AND TRADEMARK OFFICE

CERTIFICATE OF CORRECTION

PATENT NO. : 5,176,488

DATED : January 5, 1993

INVENTOR(S) : Robert A. Boda

It is certified that error appears in the above-identified patent and that said Letters Patent is hereby corrected as shown below:

In column 8, line 38, delete "in" and insert -- to -- .

Column 10, line 49, delete "in" (second occurrence) and insert --to--

Signed and Sealed this

Sixteenth Day of November, 1993

Attest:

Bruce Lehman

BRUCE LEHMAN

*Attesting Officer*

*Commissioner of Patents and Trademarks*